Figure 1:
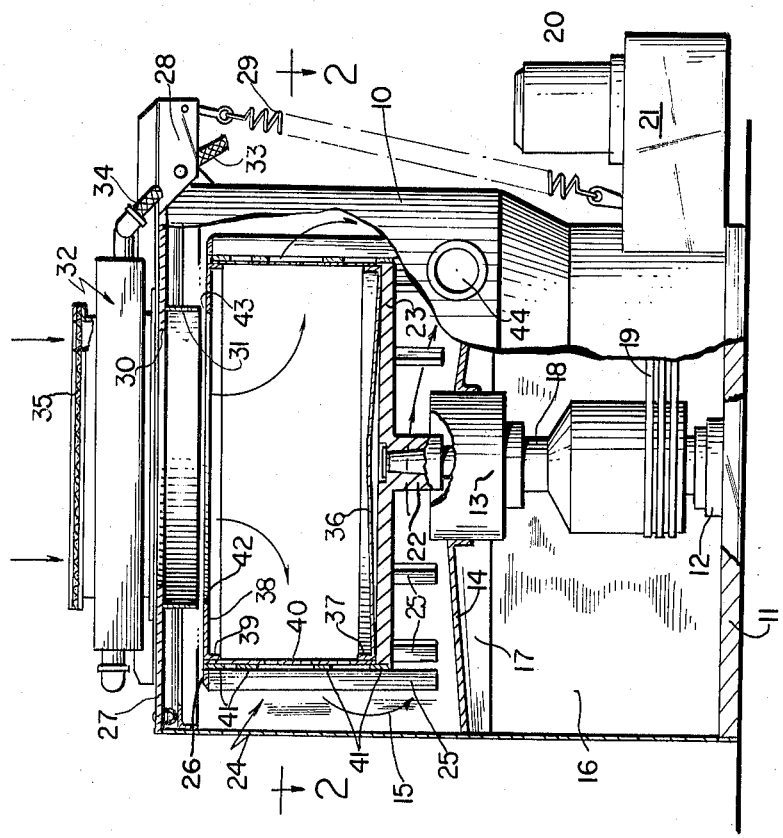

April 19, 1966     F. O'CONOR     3,246,404

CENTRIFUGAL DRYER

Filed March 13, 1963

INVENTOR
FRANK O'CONOR
BY
Robertson & Smythe
ATTORNEYS

United States Patent Office 3,246,404
Patented Apr. 19, 1966

3,246,404
CENTRIFUGAL DRYER
Frank O'Conor, Moline, Ill., assignor to Ametek, Inc., New York, N.Y., a corporation of Delaware
Filed Mar. 13, 1963, Ser. No. 264,925
4 Claims. (Cl. 34—58)

This invention relates to centrifugal separators and particularly to an improved metal parts dryer.

It is desirable in centrifugal drying of metal parts to heat air passing into the centrifugal and to induce flow of the heated air in a simple manner over the basket containing the parts. Prior devices have used rather complicated fan arrangements that have not been completely satisfactory.

The principal object of the present invention is to provide a dryer for small parts with a simple fan means.

Another object of the invention is to provide such a dryer in which heated air is forced over the articles to be dried and is exhausted by the rotary action of blades extending axially along the basket supporting means.

In one aspect of the invention, a centrifugal dryer may comprise a housing within which a vertically mounted spindle is driven by a belt or the like connecting a pulley on the spindle to a pulley on a motor attached to said housing. Various types of drives can be used including electric motors or hydraulic drives. The housing may include a horizontal wall dividing it into upper and lower compartments, in the lower of which the spindle is mounted.

In a further aspect of the invention, a basket carrier may be mounted within the housing above the partition wall, and it may include a bottom disk having a depending central sleeve provided with a tapered bore adapted to mate with, and be keyed to a tapered end of the spindle.

In still another aspect of the invention, a series of vertically and radially extending ribs may be attached at their one ends at spaced intervals about the bottom disk of the basket carrier, and the opposite ends thereof may be rigidly connected to a ring. The tapered bore in the sleeve is concentric with the ribs to provide a dynamically balanced basket carrier. A basket may be inserted into, and withdrawn from the basket carrier, the basket being one which includes an open top, perforated side walls and a solid bottom, the basket being insertable into the basket carrier.

In still another aspect of the invention, the housing may be closed and opened at its top by a hinged cover, which may be hinged thereto, the cover having a heating means for admitting heated air to the upper chamber of the housing for drying the articles contained within the basket. The cover may comprise a steam heated element or an electric heated element (not shown) over which air passes to the housing. In one form a skirt portion may depend from the cover into the housing in close proximity to the opening in the top of the basket to ensure that the incoming heated air flows into the basket and to prevent the exhausting vapors from being recirculated through the basket. In operation, the air is drawn through the screen in the top of the cover, thence across the heating element where it is dried and heated, thence into the basket over the articles therein, thence centrifugally caused to flow out through the perforated side wall of the basket, and finally out through an exhaust port in the side of the housing in communication with the interior of the upper chamber in the housing.

The above and other objects and features of the invention will become apparent from the following specification and accompanying drawing which is merely exemplary.

Figure 2:
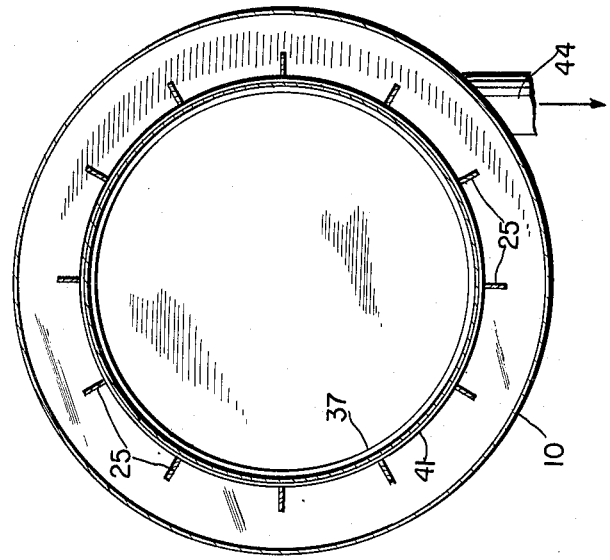

In the drawing:

FIG. 1 is a partial sectional elevational view of a centrifugal dryer to which the principles of the invention have been applied; and FIG. 2 is a sectional view taken substantially along line 2—2 of FIG. 1.

Referring to the drawing, the principles of the invention are shown as applied to a centrifugal dryer including a housing 10 having a base 11 for supporting spindle 18, spindle 18 passing through collar 13 in the center of an impervious partition 14, partition 14 separating the housing into an upper compartment 15 and a lower compartment 16. The partition 14 may be slightly conical and reinforcing ribs 17 may be attached to its lower surface as well as to the inner periphery of housing 10 and the outer periphery of the collar 13. Collar 13 may cooperate with a safety bumper ring (not shown) within the collar for limiting the swing or gyration of the spindle and basket from a vertical axis as the basket is rotated.

Spindle 18 may be provided with pulley surface means for receiving belt means 19 connecting spindle 18 to a pulley on the output shaft of a motor 20 that is mounted on a bracket 21 attached to base 11.

The upper end of spindle 18 may have a tapered surface that mates with a tapered surface formed in hub 22 integral with disk 23 forming the base of a basket carrier 24, the hub 22 and spindle 18 being keyed together. As can be seen, disk 23 is a substantial distance above partition 14. Disk 23 may have ribs, rods or bars 25 welded or otherwise fastened to it in spaced relation about the periphery of the disk, the bars being arranged in parallel relation to each other and to the axis of spindle 18. The tops of the bars 25 may support a ringe 26 that is welded or otherwise fastened thereto. The ribs or bars 25 extend downwardly below the disk 23 into the space between the disk 23 and partition 14, bars 25 forming fan blades for a purpose to be described hereafter.

The top of housing 10 is provided with a cover 27 that is pivoted to housing 10 by hinge 28. A pair of springs 29 are connected to either side of motor bracket 21 for counterweighting the cover as it is raised. Cover 27 includes a central passage 30 and may have a skirt 31 depending therefrom.

A heating unit 32 is supported on cover 27 and it may be supplied with heating fluid through inlet and outlet lines 33 and 34, for example, steam being supplied to the coils of said heating unit through said lines. The heating unit is of such construction that air is free to pass over heating coils in unit 32 as it passes into housing 10. A screen 35 can be employed to cover an opening leading to the unit 32, the entire cover assembly being adapted to be pivoted about hinge means 28. Electric heating means could be used if desired.

The basket carrier 24 is adapted to receive a basket containing parts to be treated or dried. It may include a slightly bowed sheet metal disk 36 having an upstanding flange 37 surrounding its periphery. It may also include a ring 38 having a depending flange 39 surrounding its periphery. The disk 36 and ring 38 may be axially aligned, and a perforated side wall 40 may surround the two, resting on the sides of flanges 37 and 39. The wall 40 may be welded or otherwise securely fastened to the outer sides of flanges 37 and 39; and reinforcing bands 41 may encircle the wall 40 at axially, spaced points therealong, providing a completely assembled basket.

The height of the basket, the diameter of the hole 42 of ring 38, the length of skirt 31 and its diameter are preferably such that only a slight clearance 43 exists between skirt 31 and ring 38 so that the incoming heated air is directed itno the basket as will be explained.

With the apparatus in condition shown in the drawing, and with the basket filled with wet parts to be dried, energization of motor 20 causes spindle 18 to rapidly rotate the basket. This causes fan blades 25 to force air out of chamber 15 through outlet 44 in housing 10, creating a negative pressure within said chamber. This causes outside air to be drawn through screen 35, over heating unit 32, thence into the basket containing the parts where it picks up moisture from the parts and is centrifuged radially through the perforated side wall 40 into chamber 15 where it, in turn, is picked up by the fan blades 25 and forced out through the exhaust port 44.

Although the various features of the improved centrifugal dryer have been shown and described in detail to fully disclose one embodiment of the invention, it will be evident that changes may be made in such details and certain features may be used without others without departing from the principles of the invention.

What is claimed is:

1. In a centrifugal dryer, a housing having a chamber therein, said chamber having an opening in the top thereof and an imperforate bottom wall; vertical spindle means journaled in bearing means within said housing; motor means for driving said spindle means; and basket means attached to said spindle means, said basket means having an imperforate bottom spaced substantially above the bottom wall of said chamber; ribs extending radially and vertically along the exterior circumference of said basket means, said ribs depending below the bottom of said basket means into the space between the bottom of said basket means and the bottom wall of said chamber, there being an exhaust port from said space to atmosphere, said ribs forming fan means integral with said basket within said housing, said fan means causing movement of air through the opening in the top of said housing and over articles in said basket and thence to the atmosphere without recirculating through said basket means.

2. In a centrifugal dryer, a housing having a chamber therein, said chamber having an opening in the top thereof and an imperforate bottom wall; a vertical spindle journaled in bearing means within said housing; a basket carrier within said housing and attached to said spindle, said carrier comprising a bottom disk spaced substantially above the bottom wall of said chamber and a top ring joined by peripherally spaced ribs, said ribs depending below said bottom disk into the space between the bottom of said carrier and the bottom wall of said chamber, said ribs forming fan means integral with said basket carrier; a basket within said carrier including a perforated side wall and a top ring defining a circular opening leading to the interior thereof; a hinged cover for said housing including a hole therethrough and a depending skirt about said hole that extends to a point closely adjacent the edge of the opening in the top ring of said basket when said cover is closed; a heater fixed to said cover; and an exhaust passage leading from said chamber to the atmosphere.

3. In a centrifugal dryer, a housing; a horizontal partition dividing said housing into upper and lower chambers; a spindle journaled in bearing means within said housing and extending vertically through said partition; a basket carrier within said upper chamber attached to said spindle, said carrier comprising a bottom disk spaced a substantial distance above said partition and a top ring joined by peripherally spaced ribs, said ribs depending below said bottom disk into the space between said bottom disk and said partition, said ribs forming fan means integral with said basket carrier; a basket within said carrier including a perforated side wall and a top ring defining a circular opening leading to the interior thereof; a hinged cover for said housing including a hole therethrough and a depending skirt about said hole that extends to a point closely adjacent the edge of the opening in the top ring of said basket when said cover is closed; and an exhaust passage leading from said upper chamber to the atmosphere.

4. In a centrifugal dryer, a housing; a horizontal conical shaped partition dividing said housing into upper and lower chambers; a spindle journaled in bearing means within said housing and extending vertically through said partition; a basket carrier within said upper chamber attached to said spindle, said carrier comprising a bottom disk spaced a substantial distance above said partition and a top ring joined by peripherally spaced ribs, said ribs depending below said bottom disk into the space between said bottom disk and said partition and to a point adjacent said partition, said ribs forming fan means integral with said basket carrier; a basket within said carrier including a perforated side wall and a top ring defining a circular opening leading to the interior thereof, said basket also including reinforcing straps surrounding said perforated side wall; a hinged cover for said housing including a hole therethrough and a depending skirt about said hole that extends to a point closely adjacent the edge of the opening in the top ring of said basket when said cover is closed; and an exhaust passage leading from said upper chamber to the atmosphere adjacent said partition.

References Cited by the Examiner

UNITED STATES PATENTS

| | | | |
|---|---|---|---|
| 938,358 | 10/1909 | Walther et al. | 210—380 X |
| 1,278,593 | 9/1918 | Clark et al. | |
| 1,487,071 | 3/1924 | Mabee | 159—6 |
| 1,602,463 | 10/1926 | Sparks et al. | |
| 1,687,829 | 10/1928 | Clark | 34—139 X |
| 2,521,054 | 9/1950 | Ellis. | |
| 2,543,579 | 2/1951 | Kauffman | 34—133 |
| 2,787,841 | 4/1957 | Warino | 34—58 |
| 2,838,107 | 6/1958 | Bridges et al. | 159—6 |
| 2,974,423 | 3/1961 | Hobbs | 34—58 |

FOREIGN PATENTS

| | | |
|---|---|---|
| 848,908 | 9/1960 | Great Britain. |
| 162,820 | 4/1958 | Sweden. |

WILLIAM F. O'DEA, *Primary Examiner.*

NORMAN YUDKOFF, *Examiner.*